(12) United States Patent
Yasumura et al.

(10) Patent No.: US 12,130,475 B2
(45) Date of Patent: Oct. 29, 2024

(54) SECONDARY GRID PLATES FOR OPTICAL SWITCHING APPLICATIONS

(71) Applicant: Google LLC, Mountain View, CA (US)

(72) Inventors: Kevin Yasumura, Lafayette, CA (US); Jill Berger, Saratoga, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/136,005

(22) Filed: Apr. 18, 2023

(65) Prior Publication Data

US 2023/0251431 A1    Aug. 10, 2023

Related U.S. Application Data

(63) Continuation of application No. 17/189,985, filed on Mar. 2, 2021, now Pat. No. 11,662,527.

(Continued)

(51) Int. Cl.
*G02B 6/35* (2006.01)

(52) U.S. Cl.
CPC .......... *G02B 6/353* (2013.01); *G02B 6/3518* (2013.01); *G02B 6/3598* (2013.01)

(58) Field of Classification Search
CPC .... G02B 6/353; G02B 6/3518; G02B 6/3598; G02B 6/3556; G02B 13/16; G02B 6/0833;

(Continued)

(56) References Cited

U.S. PATENT DOCUMENTS 5,018,851 A * 5/1991 Matsumura ............ A61B 3/135
351/219
6,453,083 B1    9/2002 Husain et al.
(Continued)

FOREIGN PATENT DOCUMENTS

CN  109143605 A   1/2019
TW  I459803 B    11/2014
(Continued)

OTHER PUBLICATIONS

Office Action for Taiwanese Patent Application No. 110110070 dated May 29, 2023. 10 pages.
(Continued)

*Primary Examiner* — Ryan A Lepisto
*Assistant Examiner* — Erin D Chiem
(74) *Attorney, Agent, or Firm* — Lerner David LLP

(57) ABSTRACT

An optical assembly includes a light source for providing a beam of light, a lens system configured to expand and collimate the beam of light, and a configurable beam injector, wherein the beam injector contains a first grid plate and a second grid plate to block individual beams of light. The first grid plate and the second grid plate may be configured such that each grid plate respectively corresponds to particular MEMS mirrors. The grid plates can be configured to have pathways that allow for beams of light to be passed through and other pathways which are blocked to prevent the passage of light. The first grid plate and second grid plate may thus block or allow for transmission of beams of lights to those particular MEMS mirrors. The second grid plate can be configured to be easily swappable during or removable to allow for a different set of beams of light, corresponding to a different set of MEMS mirrors, to be blocked. The second grid plate can be configured to be rotated or slid linearly within a housing.

20 Claims, 16 Drawing Sheets

Related U.S. Application Data

(60) Provisional application No. 62/991,786, filed on Mar. 19, 2020.

(58) Field of Classification Search
CPC .............. G02B 6/0841; G02B 27/0988; G02B 27/0955; G02B 27/30; H04Q 11/0003; H04Q 2011/0022; F21V 14/08; F21V 14/06; F21V 11/14; F21V 11/00; F21V 11/08; F21V 11/16; F21V 11/06
See application file for complete search history.

(56) References Cited

U.S. PATENT DOCUMENTS

| | | |
|---|---|---|
| 6,567,574 B1 | 5/2003 | Ma et al. |
| 6,744,173 B2 | 6/2004 | Behin et al. |
| 7,386,201 B1 * | 6/2008 | DiRuscio ............ G02B 6/29395 385/16 |
| 7,639,909 B2 | 12/2009 | Murshid et al. |
| 7,734,127 B2 * | 6/2010 | Korevaar ................ G02B 6/359 398/56 |
| 9,645,386 B2 | 5/2017 | Lau et al. |
| 10,120,111 B2 * | 11/2018 | Berger .................. C03C 17/007 |
| 2003/0174942 A1 | 9/2003 | Murshid et al. |
| 2004/0013347 A1 * | 1/2004 | Kuboi ................... G02B 6/359 385/17 |
| 2004/0129871 A1 * | 7/2004 | Laberge ................ G02B 27/60 250/231.18 |
| 2006/0072872 A1 | 4/2006 | Mitamura |
| 2008/0240715 A1 * | 10/2008 | Last ..................... G02B 6/3582 398/50 |
| 2009/0073696 A1 | 3/2009 | Melzner |
| 2014/0071377 A1 * | 3/2014 | Scardato ............... G02F 1/1303 438/30 |
| 2014/0131580 A1 | 5/2014 | Sidery et al. |
| 2018/0364419 A1 * | 12/2018 | Yasumura ........... G02B 6/3588 |

FOREIGN PATENT DOCUMENTS

| | | |
|---|---|---|
| WO | 2011027254 A1 | 3/2011 |
| WO | 2018231308 A1 | 12/2018 |

OTHER PUBLICATIONS

Office Action for Chinese Patent Application No. 202110285525.4 dated May 31, 2023. 9 pages.
Extended European Search Report for European Patent Application No. 21163787.1 dated Aug. 24, 2021. 11 pages.
First Office Action for Chinese Patent Application No. 202110285525.4 dated Oct. 8, 2022. 8 pages.

* cited by examiner

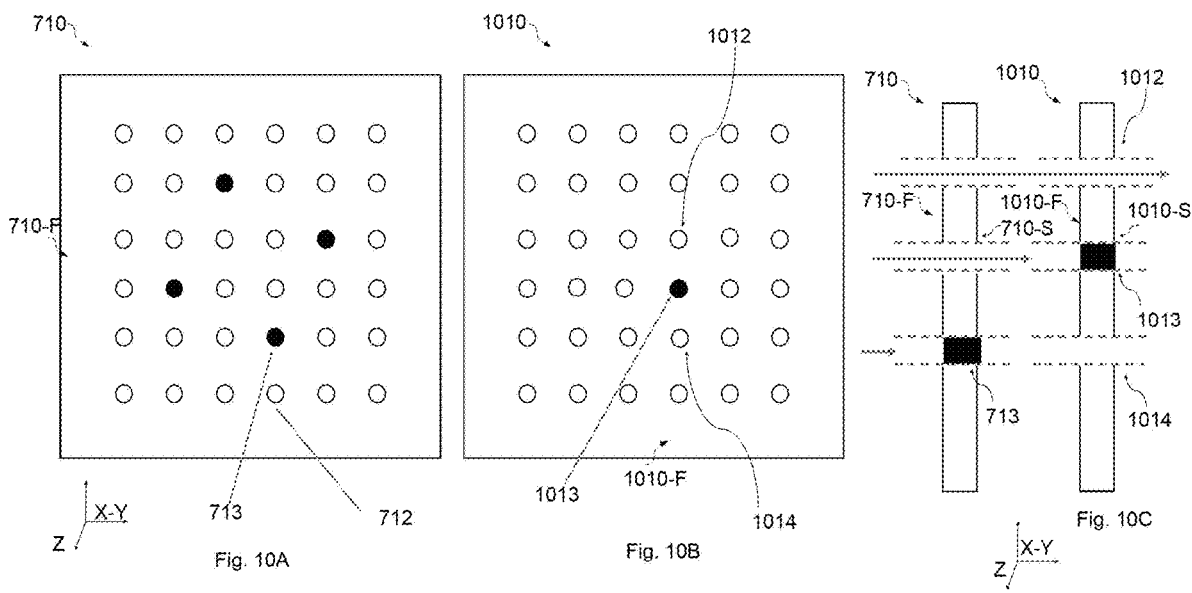

1199

Method 1300

SECONDARY GRID PLATES FOR OPTICAL SWITCHING APPLICATIONS

CROSS-REFERENCE TO RELATED APPLICATIONS

The present application is a continuation of U.S. patent application Ser. No. 17/189,985, filed Mar. 2, 2021, which claims the benefit of the filing date of U.S. Provisional Patent Application No. 62/991,786, filed Mar. 19, 2020, the disclosure of which is hereby incorporated herein by reference.

BACKGROUND

Optical communications use modulated light beams to convey information through optical fibers, free space, or waveguides. A beam of light may be modulated either directly by modulating current to a light source, or externally by using an optical modulator to modulate a continuous-wave light beam produced by the light source. External modulation has advantages in that it may handle higher power and frequencies; however, the required components may be larger, more complex, and more expensive.

An optical circuit switch (OCS) is an all-optical, 3D switching matrix that may direct light from any input fiber N to any output fiber M by changing the angles of the mirrors in one or more micro-electromechanical system (MEMS) mirror arrays. The switch is designed for low insertion loss over a broad wavelength range, so each fiber may carry many wavelengths. The OCS is also designed for fast, reliable switching by the MEMS mirror arrays. Optical performance requirements include insertion loss, return loss, dynamic optical crosstalk, and static optical crosstalk.

SUMMARY

The present disclosure provides a configurable blocking mechanism through the use of two grid plates to dynamically prevent the transmission of identified beams of light onto a MEMS mirror array. Although other methods exist to prevent the transmission of beams of light, such as parking or inking, these methods have their limitations. For example, although it is possible to "park" a mirror out of a camera sensor field of view in a servo system, the process requires high voltages, which can damage or prematurely age the instrumentation to later move the parked mirror. A configurable beam injector can contain a plurality of grid plates to block beams of light and can consist of a number of beam pathways, wherein each beam pathway can correspond to a particular beam of light. The configurable beam injector can contain for example a first grid plate and a second grid plate. The first grid plate and second grid plate can contain a number of beam pathways, which allow light to be transmitted through the grid plate, and a number of blocked beam pathways, which block the transmission of light beams through the grid plate. The grid plates can form the blocked beam pathways through the use of epoxy, optically sensitive materials, or through the material of the grid plate itself.

One aspect of the disclosure provides a configurable beam injector including a light source, such as a laser, which is adapted to generate a beam of light, a plurality of lenses configured to receive the beam of light from the light source and collimate the received beam of light, and a first grid plate and a second grid plate to block beams of light. The first grid plate and the second grid plate can have a first side, a second side, a plurality of unblocked beam pathways, and a plurality of blocked beam pathways. The first side of the second grid plate can be positioned facing the second side of the first grid plate. The first grid plate can be configured to block a first plurality of beams of light by the plurality of blocked beam pathways, and transmit the remaining beams of light through the unblocked beam pathways. The second grid plate can be configured to block a second subset of beams of light from the remaining beams of light transmitted through the first grid plate.

Additional aspects of this disclosure provide a configurable beam injector including substantially aligning the second grid plate and the first grid plate. The configurable beam injector can be included within an optical circuit switch. The configurable beam injector can be configured to transmit a number of beams that corresponds to a number of MEMS mirrors in the optical circuit switch. The configurable beam injector can contain a housing for a second grid plate. The housing can be configured to allow for insertion and removal of the second grid plate while the configurable beam injector is operational. The configurable beam injector can be configured to allow for rotation of the second grid plate. The configurable beam injector can comprise a data connector to allow it to be in data communication with the OCS. The first grid plate and the second grid plate can be patterned in concentric circles. The first grid plate and the second grid plate can contain a square pattern of beam arrays. The first grid plate and the second grid plate can contain an optical blocking material to form blocked beam pathways. The first grid plate and the second grid plate contain a number of pathways for the beams of light that correspond to a number of MEMS mirrors used in an optical circuit switch.

Additional aspects of this disclosure provide an optical circuit switch including a microelectromechanical systems (MEMS) mirror configured to receive a beam of light, a camera configured to capture the beam of light, a fiber collimator; and a configurable beam injector which can further include a light source, such as a laser, which is adapted to generate a beam of light, a plurality of lenses configured to receive the beam of light from the light source and collimate the received beam of light, and a first grid plate and a second grid plate. The first grid plate and the second grid plate can have a first side, a second side, a plurality of unblocked beam pathways, and a plurality of blocked beam pathways. The first side of the second grid plate can be positioned facing the second side of the first grid plate. The first grid plate can be configured to block a first plurality of beams of light by the plurality of blocked beam pathways, and transmit the remaining beams of light through the unblocked beam pathways. The second grid plate can be configured to block a second subset of beams of light from the remaining beams of light transmitted through the first grid plate.

Additional aspects of this disclosure provide a method any combination of: providing a first grid plate with a number of beam pathways and blocked beam pathways based on a first subset of a microelectromechanical systems (MEMS) mirrors, to block beams of light to the first subset of MEMS mirrors; providing a second grid plate with a number of beam pathways and blocked beam pathways based on a first subset of MEMS mirrors, to block beams of light to the second subset of MEMS mirrors; sequentially arranging the first grid plate and the second grid plate in a path of beams of light generated from the light source such that the first grid plate blocks beams of light corresponding to a first subset of MEMS mirrors and the second grid plate blocks beams of light corresponding to a second subset of MEMS mirrors; blocking by the first grid plate beams of light to the first subset of MEMS mirrors; blocking by the second grid plate beams of light to the second subset of MEMS mirrors; wherein the first subset and the second subset of MEMS mirrors do not contain a common MEMS mirror.

Additional aspects of this disclosure provide a method any combination of: providing a first grid plate with a number of beam pathways and blocked beam pathways based on a first subset of a microelectromechanical systems (MEMS) mirrors, to block beams of light to the first subset of MEMS mirrors; providing a second grid plate with a number of beam pathways and blocked beam pathways based on a first subset of MEMS mirrors, to block beams of light to the second subset of MEMS mirrors; sequentially arranging the first grid plate and the second grid plate in a path of beams of light generated from the light source such that the first grid plate blocks beams of light corresponding to a first subset of MEMS mirrors and the second grid plate blocks beams of light corresponding to a second subset of MEMS mirrors; blocking by the first grid plate beams of light to the first subset of MEMS mirrors; blocking by the second grid plate beams of light to the second subset of MEMS mirrors; wherein the first subset and the second subset of MEMS mirrors do not contain a common MEMS mirror; capturing, by a camera, an image wherein the image represents blocked beams with dark spots and unblocked beams with light spots; providing a third grid plate with a number of beam pathways and blocked beam pathways; configuring the third grid plate differently than the first grid plate and the second grid plate; replacing the first grid plate or the second grid plate with the third grid plate.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 10A-10C are diagrams of a grid plates for use in an integrated optical assembly and a side view of the grid plates according to aspects of the disclosure;

DETAILED DESCRIPTION

This disclosure generally relates to methods, systems, and apparatuses to control for the transmission of beams of light within an optical circuit switch (OCS). In particular, the beam injector is configured to selectively illuminate certain MEMS mirrors while blocking other rays of light from reaching the individual beams. The beams may be blocked by, for example, the use of two grid plates placed in the path of beams being generated by the beam injector by configuring the plates to only allow for selective beams to pass through. In this regard, the primary and secondary grid plate may collectively block light beams from reaching two subsets of the set of MEMS mirrors.

Figure 1:
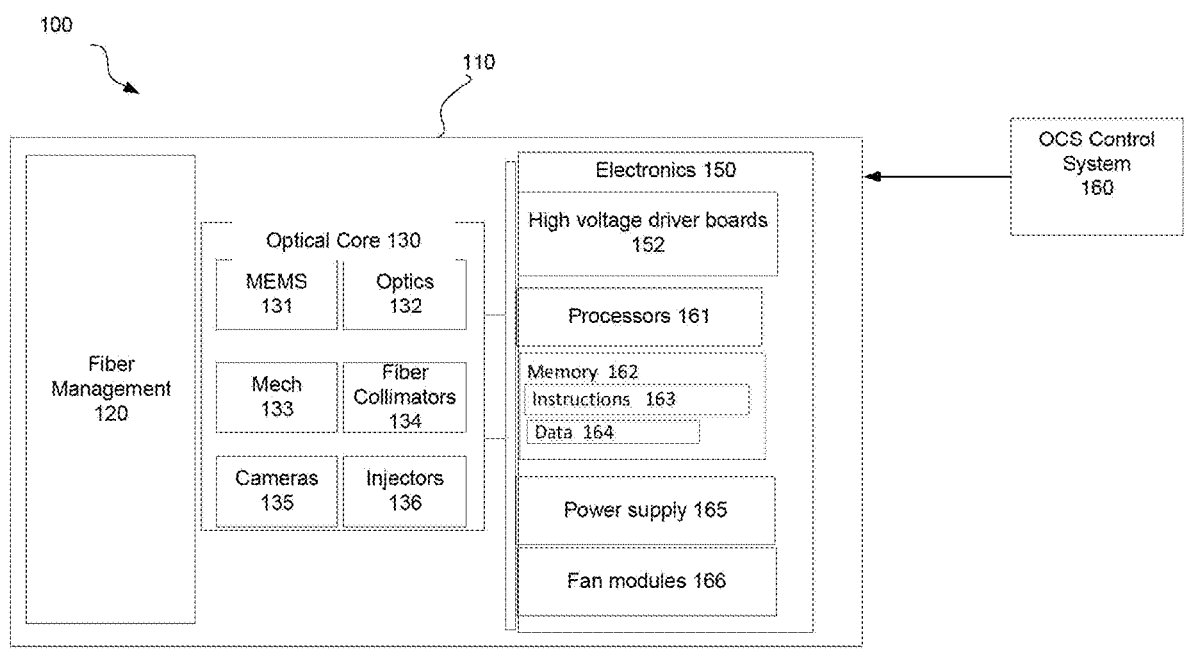
FIG. 1 is a block diagram of an example optical circuit switch according to aspects of the disclosure.

FIG. 1 illustrates an example OCS 100. The OCS 100 includes a structure such as chassis 110 supporting a number of components. In a front of the OCS chassis 110 are optical fiber connections, such as fiber management block 120. The OCS 100 may further include, such as in a middle, an optical core 130. The optical core houses MEMS 131, fiber collimators 134, optics 132, cameras 135, and injectors 136 and other mechanisms 133. A rear of the OCS 100 includes electronics 150, such as high voltage driver boards 152 for the MEMS, one or more processors 161, such as a CPU board, one or more memories 162 storing executable software, and power supplies 165 and fan modules 166. The chassis 110 interfaces with OCS control system 160. While a number of components are shown, it should be understood that such components are merely non-limiting examples, and that other components may additionally or alternatively be included.

There may be any number of input fibers and output fibers connected to the front of the OCS chassis 110. Inside the chassis 110, these fibers are connected to the fiber collimators 134.

The fiber collimators 134 are lensed fiber arrays. Just as one example, the fiber collimators 134 may include tens or hundreds or more fiber arrays. The fibers are assembled in a hole array that matches a MEMS array grid pattern, thereby forming a fiber array. The hole array may be made of silicon or other materials. The fiber array is attached to a mounting flange. A lens array is aligned and attached to the fiber array. Fiber and lens position errors are very tightly controlled.

The one or more processors 161 may be any conventional processors, such as commercially available microprocessors. Alternatively, the one or more processors may be a dedicated device such as an application specific integrated circuit (ASIC) or other hardware-based processor. Although FIG. 1 functionally illustrates the processor, memory, and other elements of the OCS control system 160 as being within the same respective blocks, it will be understood by those of ordinary skill in the art that the processor or memory may actually include multiple processors or memories that may or may not be stored within the same physical housing. Similarly, the memory may be a hard drive or other storage media located in a housing different from that of the OCS control system 160. Accordingly, references to a processor or computing device will be understood to include references to a collection of processors or computing devices or memories that may or may not operate in parallel.

Memory 162 may store information that is accessible by the processors 161, including instructions 163 that may be executed by the processors 161, and data 164. The memory 162 may be of a type of memory operative to store information accessible by the processors 161, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 163 and data 164 are stored on different types of media.

Data 164 may be retrieved, stored or modified by processors 161 in accordance with the instructions 163. For instance, although the present disclosure is not limited by a particular data structure, the data 164 may be stored in computer registers, in a relational database as a table having a plurality of different fields and records, XML documents, or flat files. The data 164 may also be formatted in a computer-readable format such as, but not limited to, binary values, ASCII or Unicode. By further way of example only, the data 164 may be stored as bitmaps comprised of pixels that are stored in compressed or uncompressed, or various image formats (e.g., JPEG), vector-based formats (e.g., SVG) or computer instructions for drawing graphics. Moreover, the data 164 may comprise information sufficient to identify the relevant information, such as numbers, descriptive text, proprietary codes, pointers, references to data stored in other memories (including other network locations) or information that is used by a function to calculate the relevant data.

It should be understood that the optical circuit switch may include other components which are not shown but may be utilized in execution of the instructions 163.

Figure 2A:
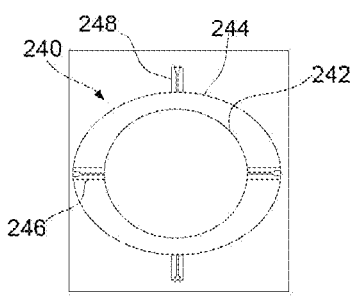
FIG. 2A is a diagram of a two-axis microelectromechanical system (MEMS) mirror assembly for use in an integrated optical assembly, according to aspects of the disclosure.

FIG. 2A illustrates an example MEMS mirror 240. The MEMS mirror 240 may be approximately 1 mm in size and highly reflective. For example, the MEMS mirror 240 may be coated with a highly reflective material, such as gold. The mirror 240 includes an inner portion 242 and an outer portion 244, wherein the inner portion is rotatable about a first axis and the outer portion is rotatable about a second axis. For example, the inner portion may rotate about inner torsion beams 246 actuated by a comb drive actuator. The outer portion may rotate about outer torsion beams 248 actuated by a comb drive actuator. The comb drive actuators may be high voltage, electro-static vertical comb drives which rotate the mirrors about the torsion beams. For example, the rotation may be approximately +/−1-10 degrees when a voltage ranging between 10s of volts to hundreds of volts is applied across the electrodes.

Figure 2B:
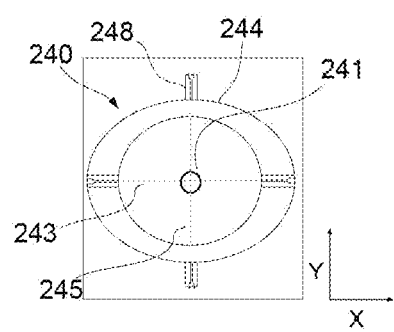
FIG. 2B is a diagram of a two-axis microelectromechanical system (MEMS) mirror assembly for use in an integrated optical assembly, according to aspects of the disclosure.

FIG. 2B illustrates additional aspects of MEMS mirror 240. FIG. 2B illustrates the centroid of MEMS mirror 240, centroid 241. Centroid 241 may correspond with the center of mass of MEMS mirror 240. For example, when the density of the MEMS mirror is uniform, the center of mass and the centroid 241 would be at the same location. FIG. 2B also illustrates a first axis 243 of rotation, such as an x-axis. Similarly, FIG. 2B illustrates a second axis 245 of rotation, such as a y-axis. Rotation of the MEMS mirror about either axis 243 or axis 245 may be achieved through rotating torsion beam 246 or torsion beam 248 respectively. By actuation of all torsion beams attached to MEMS mirror 240, it is possible to move MEMS mirror 240 in a direction perpendicular to the plane formed by the two axes of rotation, axis 243 and axis 245, such as a z-axis. Thus, the MEMS mirror may be moved in at least three independent directions. The movement of the MEMS mirror in these three independent directions may also be referred to as tip, tilt, and piston actuation of the MEMS mirror. The amount of movement of the MEMS mirror may be tracked by the movement of centroid 241 with respect to three independent axes, such as an x-axis, y-axis, and z-axis.

In some examples, it may be necessary to adjust the positioning of one or more MEMS mirrors, such as MEMS mirror 240. As an example, it may be necessary to remove a MEMS mirror out of the path of a light beam. As another example, it may be necessary to remove one of the MEMS mirrors out of the field of view of a particular camera. Removing a MEMS mirror from the camera field of view may be referred to as "parking" of the MEMS mirror. Parking may be achieved by applying voltages to the driver elements capable of moving a MEMS mirror. However, the high voltage required to park a MEMS mirror may damage the driver elements associated with the MEMS mirror through more stress on electronic components and aging, increasing the likelihood of failure in the future. Additional methods and apparatuses to prevent the interference caused by an unwanted light beams are discussed below.

Figure 3:
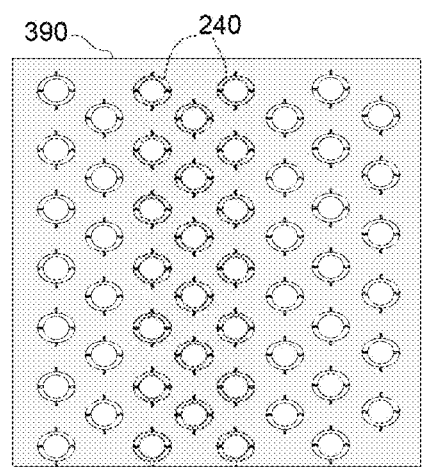
FIG. 3 is a diagram of a two-axis microelectromechanical system (MEMS) mirror assembly for use in an integrated optical assembly, according to aspects of the disclosure.

FIG. 3 illustrates an example die 390 including an array of MEMS mirrors 240. According to some examples, the MEMS die packages include MEMS mirror arrays, but in other examples any number of MEMS mirrors may be included. The die may be hermetically sealed inside a package with a window in its lid. Not all of the mirrors may be needed or used at a same time. For example, only the best mirrors and fibers in a MEMS mirror array may be selected to make an optical switch, which may be divided as a number of ports+several spares.

Figure 4:
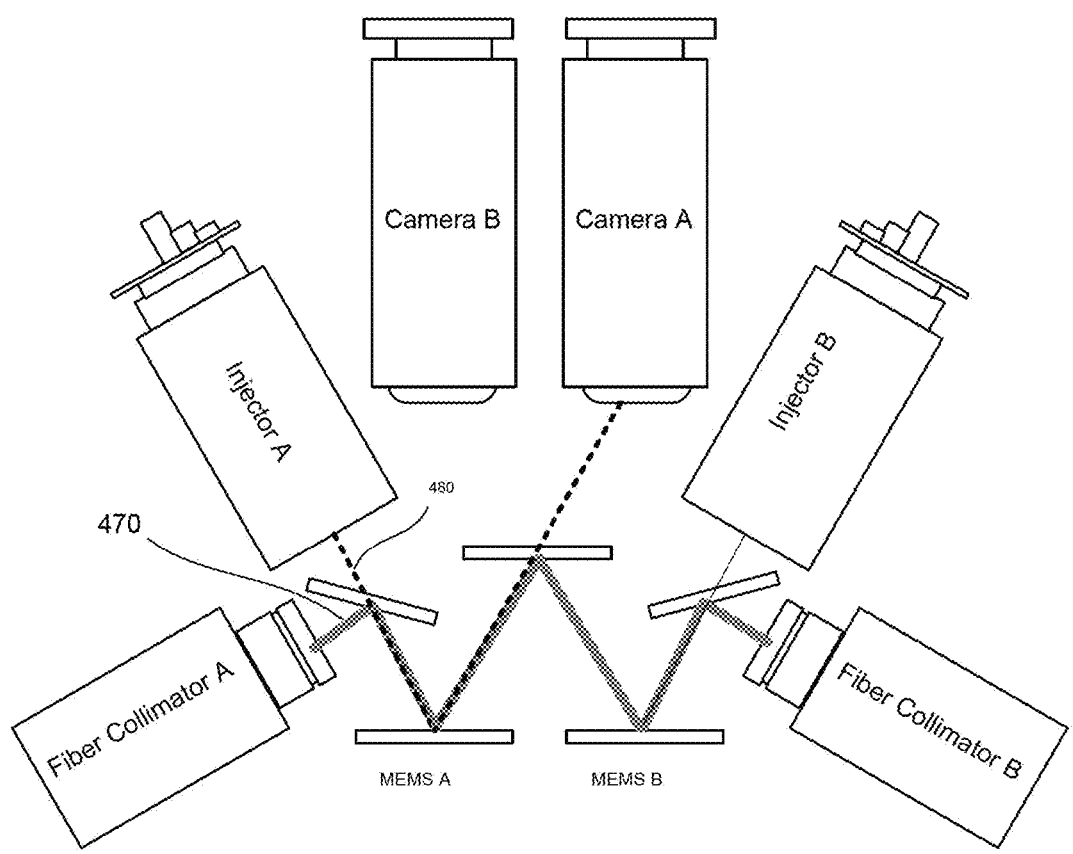
FIG. 4 is a diagram of an optical circuit switch, according to aspects of the disclosure.

FIG. 4 provides an example of a data optical path and a monitor optical path included in the optical core. On data path 470, traffic comes in as light input to fiber collimator A. All of the optics in the data path 470 may be designed for very low loss over a variety of wavelengths. The light travels along this path 470, and is reflected from MEMSA, then from MEMSB, then is coupled to output fiber collimator B. MEMS A and MEMS B may be just two MEMS mirrors of a larger array, such as illustrated in FIG. 3 and explained above. By rotating the mirrors in the array, light from any input fiber may be coupled to any output fiber. The injectors shine small laser beams on the MEMS. The cameras image the beams reflected from the MEMS to measure the mirror positions.

Monitor path 480 does not carry data, but provides information to a mirror control system about the positions of the mirrors. This may be done using, for example, an injector to shine small beams on each of the MEMS mirrors, and a camera to view the positions of the beams reflected from the MEMS. There may be a camera/injector pair for each MEMS.

Figure 5:
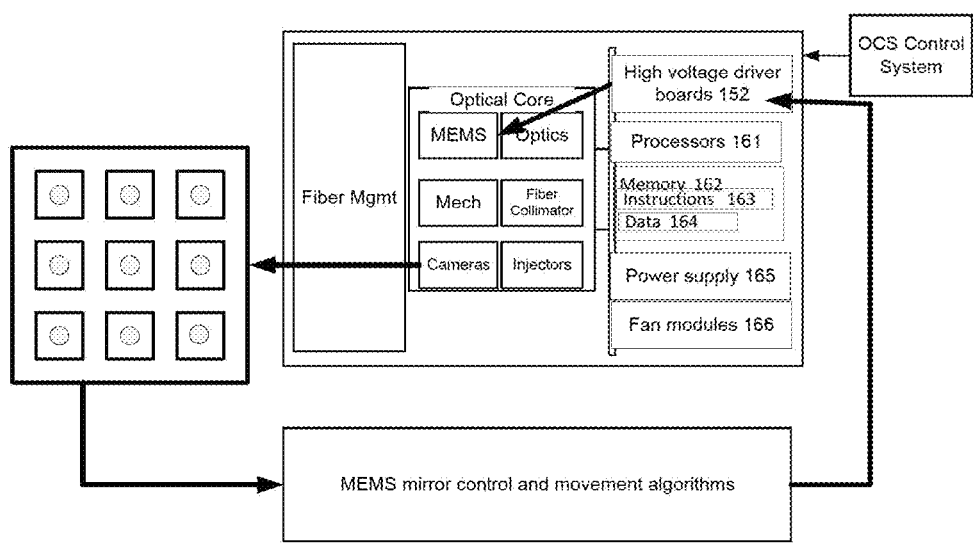
FIG. 5 is a diagram of a feedback in a mirror control loop according to aspects of the disclosure.

FIG. 5 illustrates an example mirror control loop. The OCS control system 160 tells the OCS what configuration it should be in. The mirror control loop handles the MEMS mirror control and movement algorithms based on the monitor path data, and then tells the high voltage drivers to move the mirrors.

Figure 6A:
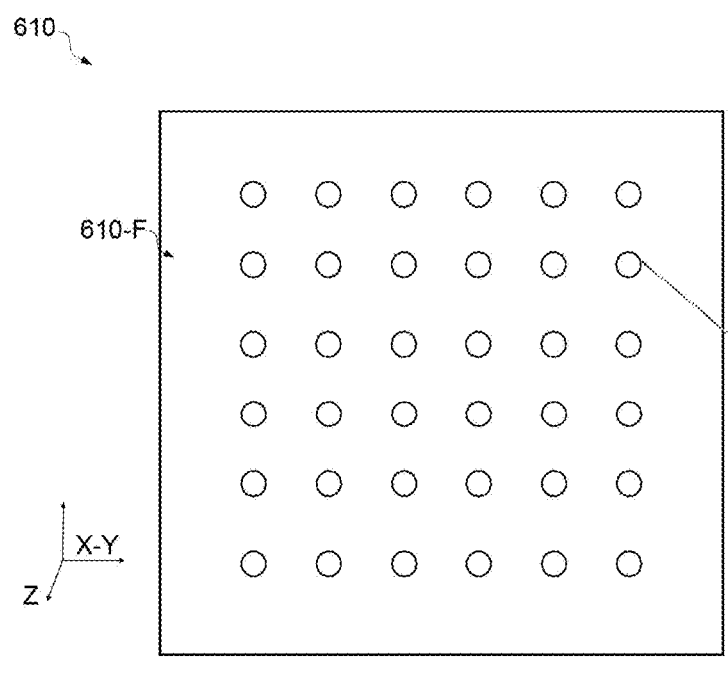
FIG. 6A is a diagram of a grid plate for use in an integrated optical assembly according to aspects of this disclosure.

FIG. 6A illustrates aspects of grid plate 610. FIG. 6A illustrates the grid plate 610, a number of beam pathways 612, and a first side 610-F. Grid plate 610 may have a first side, 610-F, from which the beam pathways, such as beam path 612 begins, and a second side (not illustrated), onto which the beam pathways end. Grid plate 610 may be of an appropriate thickness and be made of any suitable material, for example, depending on an application for which the grid plate is used. For example, the grid plate may be approximately 1 mm thick for use in an OCS and in some examples can be patterned with a reflective material on the order of hundreds of nanometers. In some examples, the grid plates can be made from glass or formed in the shape of a glass shape with apertures patterned in low reflectance chrome (LRC) or other material. Glass which makes up the grid plate can be selected based on thermal or other physical properties. In other examples, the material that makes grid plate 610 may vary. For example, the material may be selected based on its thermal expansion coefficient, its durability, commercial availability, or suitability for being manipulated or casted into a mold. In one example, the material may be aluminum.

Each beam pathway 612 may be created within the grid plate by any suitable fabrication method to allow for a space through which beams of light may propagate. For example, the beam pathways 612 may be chemically etched, drilled, molded, laser etched, sheared, stamped, punched or otherwise removed from a material during the fabrication of grid plate 610. Once formed, the beam pathways can be plated in a material different than grid plate 610. The beam pathways may have an appropriate thickness and uniformity to allow beams of light to pass through them for use in the OCS. For example, the beam pathways may be of a cylindrical shape, with a radius of the cylinder on the order of a millimeters, such as for example, between 0.01 and 2 mm, and the length of the cylinder running through the thickness of the grid plate 610. The beam pathways, such as beam pathway 612, may be formed in a grid pattern. While FIG. 6A illustrates a number of beam pathways in a particular grid pattern, it should be understood that the grid plate 610 may include any number of beam pathways arranged in any of a variety of patterns.

As explained below, the beam pathways can be "unblocked" when they allow light to pass through them, or "blocked" when they do not allow light to pass through them, such as when a material is placed on either side of the grid plate to block the beam pathway. The number of beam pathways may correspond to the number of MEMS mirrors in the OCS for example.

The first side 610-F of grid plate 610 may be configured to prevent beams of light from passing through. This may occur as an intrinsic property of the grid plate 610 when it is made of a material which does not allow for light to pass through it. In some examples, the alignment of beams to the MEMs mirror described above can occur through active methods. In some examples, the grid plate can be epoxied or otherwise secured to the housing.

Figure 6B:
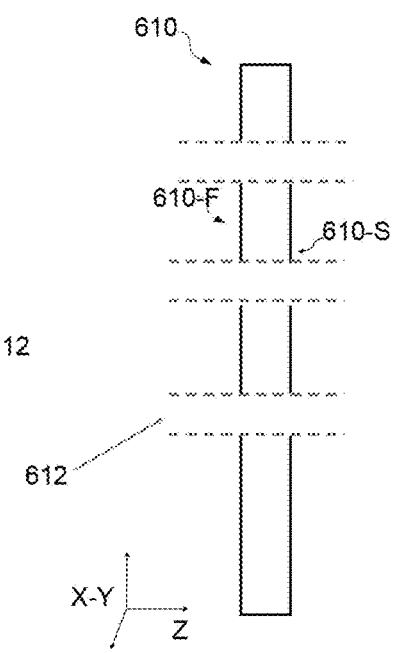
FIG. 6B is a diagram of a grid plate for use in an integrated optical assembly according to aspects of this disclosure.

FIG. 6B illustrates another view of grid plate 610. FIG. 6B illustrates a first side, 610-F, and a second side, 610-S, of the grid plate 610. The first and second sides may be formed along the longer portions of the grid plate 610. Also illustrated in dotted lines are representations of the beam pathways through the thickness of the grid plate 610, such as beam pathway 612.

Figures 7A, 7B:
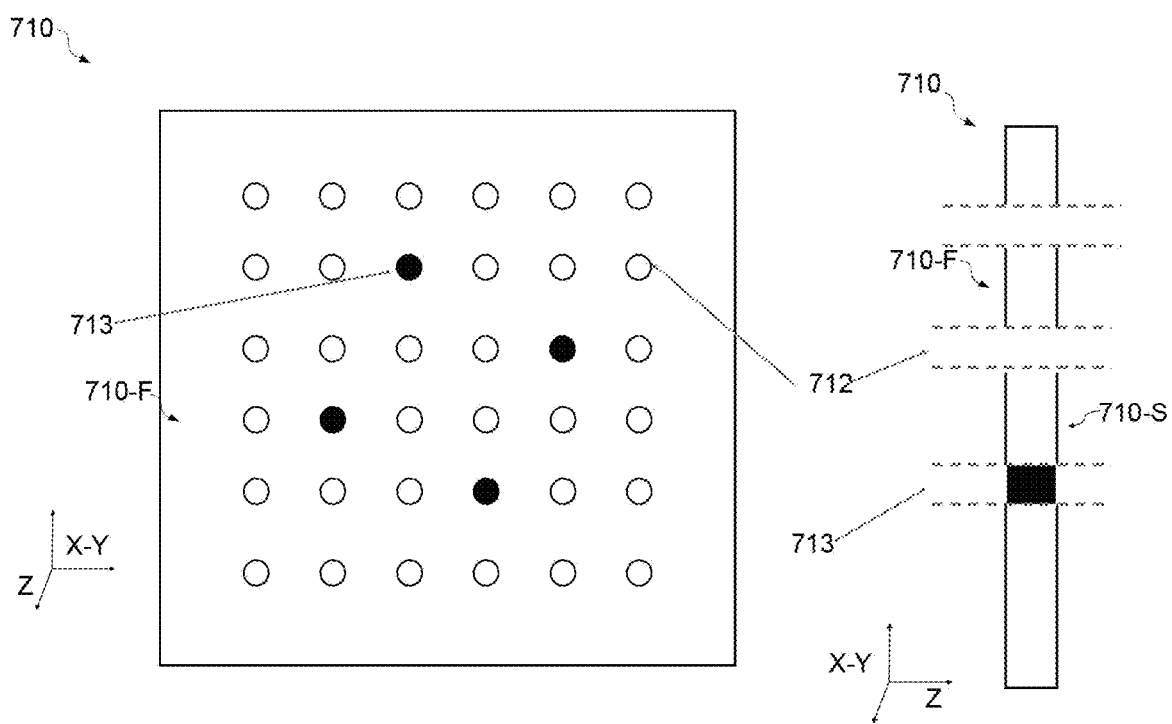
FIG. 7A is a diagram of a grid plate for use in an integrated optical assembly according to aspects of this disclosure.
FIG. 7B is a diagram of a grid plate for use in an integrated optical assembly according to aspects of this disclosure.

FIG. 7A illustrates additional aspects of a grid plate, grid plate 710. FIG. 7A illustrates the grid plate 710, a number of beam pathways, 712, and a first side 710-F, and blocked beam pathways, such as blocked beam pathway 713. In some examples, blocked beam pathways may be formed from the beam pathways by adding an epoxy, such as a black epoxy, on either side of a grid plate where it may be desirable to block a beam of light. In other examples, other variations of blocking a beam pathway may be used.

FIG. 7B illustrates another view of aspects of a grid plate, grid plate 710. FIG. 7B illustrates a first side 710-F, a second side 710-S, a beam pathway 712, and a blocked beam pathway 713. In some examples, an epoxy is applied to either side of grid plate 710 in order to block an aperture location and block light. In the example of epoxy, the epoxy may be inserted into a beam pathway, such as beam pathway 712. Also illustrated is FIG. 7B a cross-sectional view, wherein the blocked beam pathway, such as beam pathway 713, is represented in a black block, while the unblocked beam paths, such as beam pathway 712, are represented in a dotted line. Although represented in FIG. 7B and other figures of this disclosure as a black block to illustrate that the transmission of light is not possible through the space, a blocked beam pathway need not require material to be added or inserted within the thickness of the grid plate.

Figure 8:
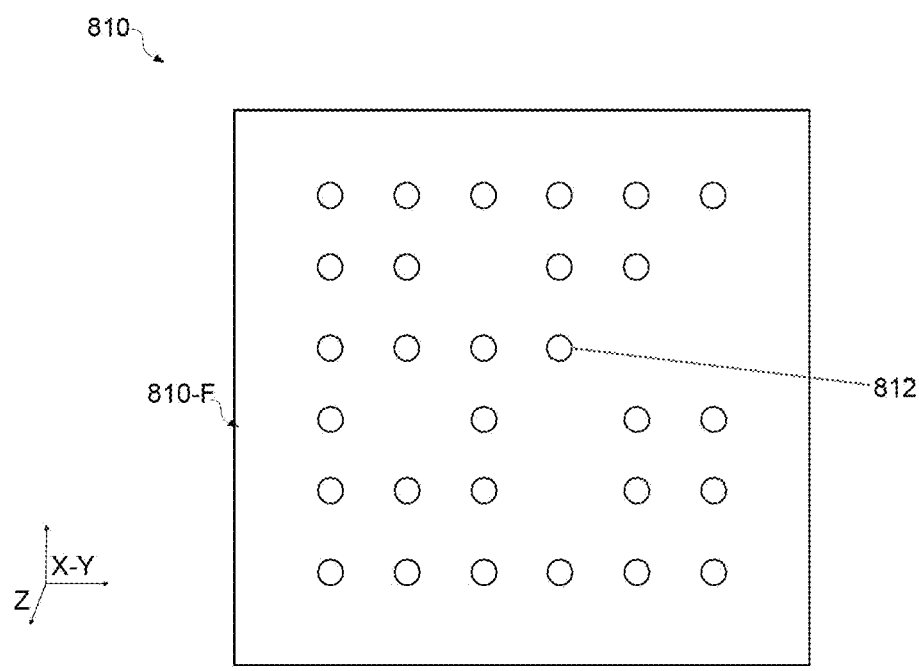
FIG. 8 is a diagram of a grid plate for use in an integrated optical assembly according to aspects of this disclosure.

FIG. 8 illustrates additional aspects of a grid plate, grid plate 810. FIG. 8 illustrates the grid plate 810, a number of beam pathways 812, and a first side 810-F. The number of beam pathways in FIG. 8 is only a subset of the total number shown in FIG. 6A. In this configuration, only beam pathways through which light is intended to pass may be formed in the grid plate 810. Thus, light beams not arriving at the surface 810-F at a location which contains a beam pathway would not be transmitted through the grid plate 810. In this example, it is not necessary to block certain beam pathways as they were never formed. For example, the beam pathways that are formed can correspond to the subset of MEMS mirrors which are intended to be utilized in the operation of the OCS.

Figure 9:
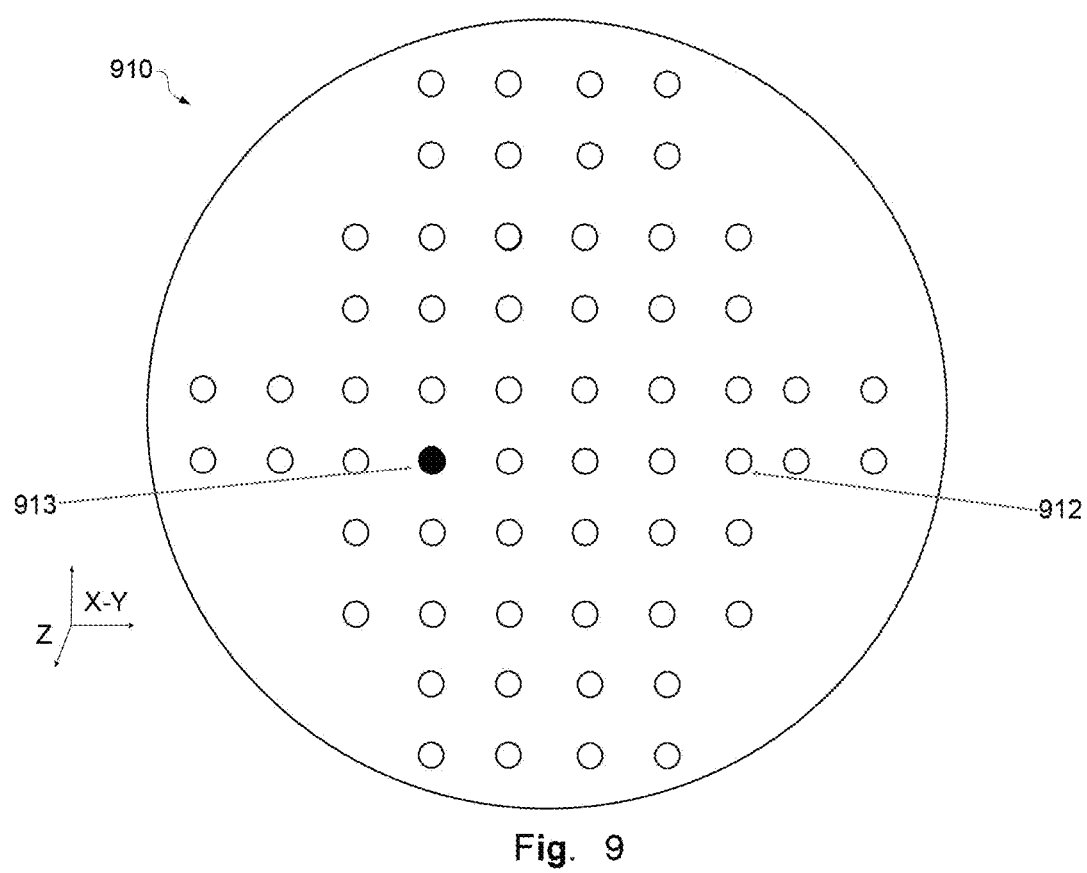
FIG. 9 is a diagram of a grid plate for use in an integrated optical assembly according to aspects of this disclosure.

FIG. 9 illustrates additional aspects of grid plate 910. FIG. 9 illustrates grid plate 910, a number of beam pathways, such as beam pathway 912, a blocked beam pathway 913, and a first side 910-F. Grid plate 910 in this case is a circular grid plate. The grid plate may have a suitable diameter for use in any OCS application. The grid plate 610 may further have any suitable shape or configuration to allow for the grid plate to be inserted into a housing for the grid plate, which may thus eliminate the need for mounting locations, such as mounting location 911. For example, grid plate 910 may be "ground" or otherwise shaped along its outside circumference to enable the grid plate 910 to be configured to be mechanically compatible with a housing. Grid plate 910 may thus be placed within a housing without the need for mounting equipment. Grid plate 910 if mechanically compatible with a housing, may be rotated within a housing through mechanical, magnetic, or electrical manipulation. If rotated, the location of blocked beam pathway 913 relative to incoming beams may be changed, thus allowing for a different beam to be blocked. This rotation can occur responsive to commands received through an OCS described above.

FIG. 10A is another illustration of an example configuration of a grid plate, grid plate 710, as described above with reference to FIG. 7A. FIG. 10B illustrates grid plate 1010, a number of beam pathways, such as beam pathway 1012, beam pathway 1014, blocked beam pathways, such as blocked beam pathway 1013, and a first side 1010-F. Grid plate 1010 may be configured to be used in conjunction with the first grid plate 710. Grid plate 1010 may have similar features to grid plate 710. A first grid plate, such as grid plate 710, and a second grid plate, such as grid plate 1010, may otherwise correspond in the number of total beam pathways, but may contain different blocked beam pathways. When used in the OCS injector system, these blocked beam pathways, correspond to different MEMS mirrors.

Illustrated in FIG. 10C is a side view of grid plate 710 and 1010 illustrating how beams of light (unlabeled) are blocked by either grid plate 710 or 1010, or otherwise pass through both grid plates. FIG. 10C illustrates a side view of grid plate 710, discussed above in reference to FIG. 7B, and a side view of grid plate 1010, with a front side 1010-F and a second side 1010-S. In some examples, the diameter of beam pathways of one grid plate can differ from the second grid plate. For example, the primary or first grid plate can have beam pathways of a diameter on the order of 0.1 mm to 1 mm while the second grid plate can have diameters double the diameter of the beam pathways of the first grid plate, such as ranging from 0.2 mm to 2 mm. In some examples, the diameters of the beam pathways of the second grid plate with respect to the first grid plate can be chosen such that the alignment tolerances of the second grid plate are larger and alignment of the two grid plates can be performed with greater accuracy or ease. In some examples, one grid plate can form or act as injector beamlets from the collimated laser source.

For example, if only 4 MEMS mirrors are being used from an array of 16 MEMS mirrors in the operation of the OCS, grid plate 710 may block beams of light from reaching 8 of these mirrors. These 8 blocked mirrors may correspond to mirrors which are not optically suitable and are determined after the fabrication of the MEMS mirror array. Grid plate 1010 may block light from reaching an additional set of 4 different MEMS mirrors from the remaining unblocked 8 mirrors. If a different set of 4 mirrors from the remaining 8 are desired to be used, it is possible to only modify or replace grid plate 1010 to achieve this effect while leaving grid plate 710 fixed and unchanged.

Although generally illustrated in a "grid" pattern in FIGS. 6A-10C, the beam pathways may be formed in any suitable pattern, such as for example a radial pattern, patterns of concentric circles, or a Fibonacci pattern. For example, both a first grid plate and a second grid plate can have the same pattern of beam pathways formed on them. The pathways can be formed in a square pattern of beam pathways. The pathways can be a rectangular pattern, grid shaped pattern, star shaped pattern, a pattern of concentric circles, wherein the difference between the radius of any two concentric circles is greater than the size of the beam pathways. The beam pathways can further be of different sizes or shapes. The beam pathways can have a varying geometry along the length of the beam pathway. The first and second grid plate can also be of different sizes and geometries.

FIGS. 11A, 11B, 11C, and 12 illustrate additional aspects of the grid plates as used in an OCS system. The Cartesian coordinates are used between the illustrative figures to represent various aspects of the grid plates from various views.

Figure 11A:
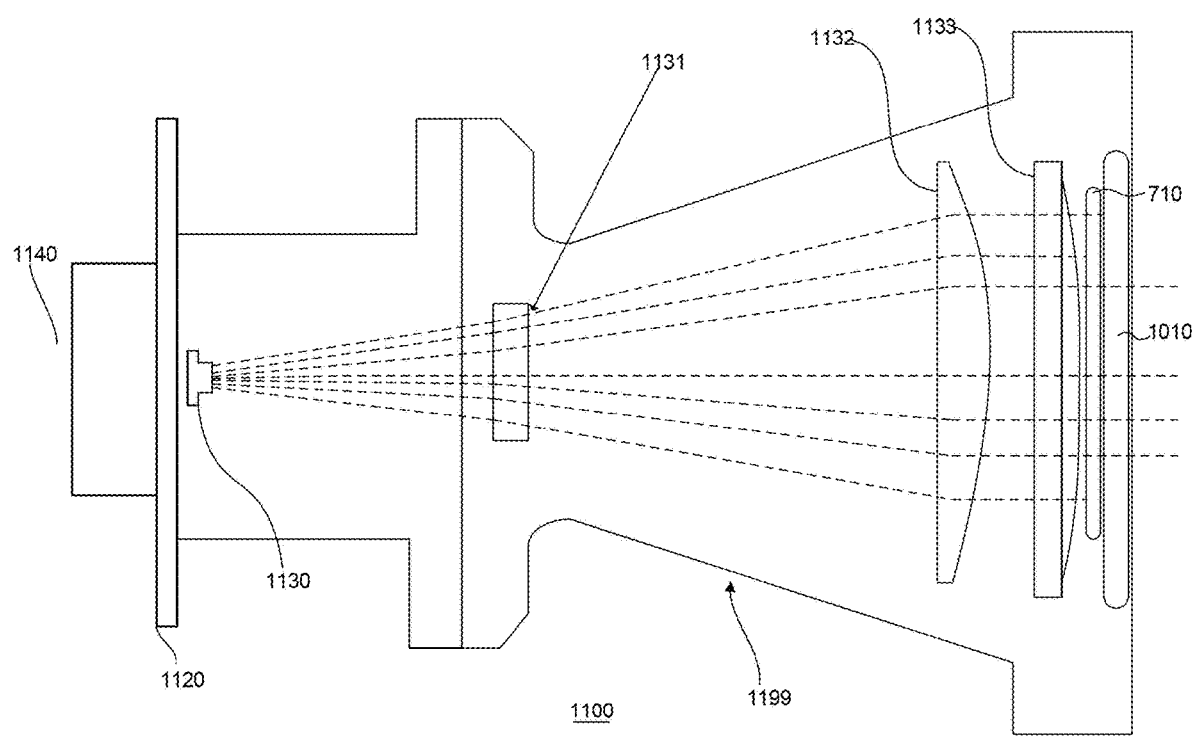
FIG. 11A-11C are diagrams illustrating various aspects of an injector for use in an integrated optical assembly according to aspects of the disclosure.
Figure 11B:
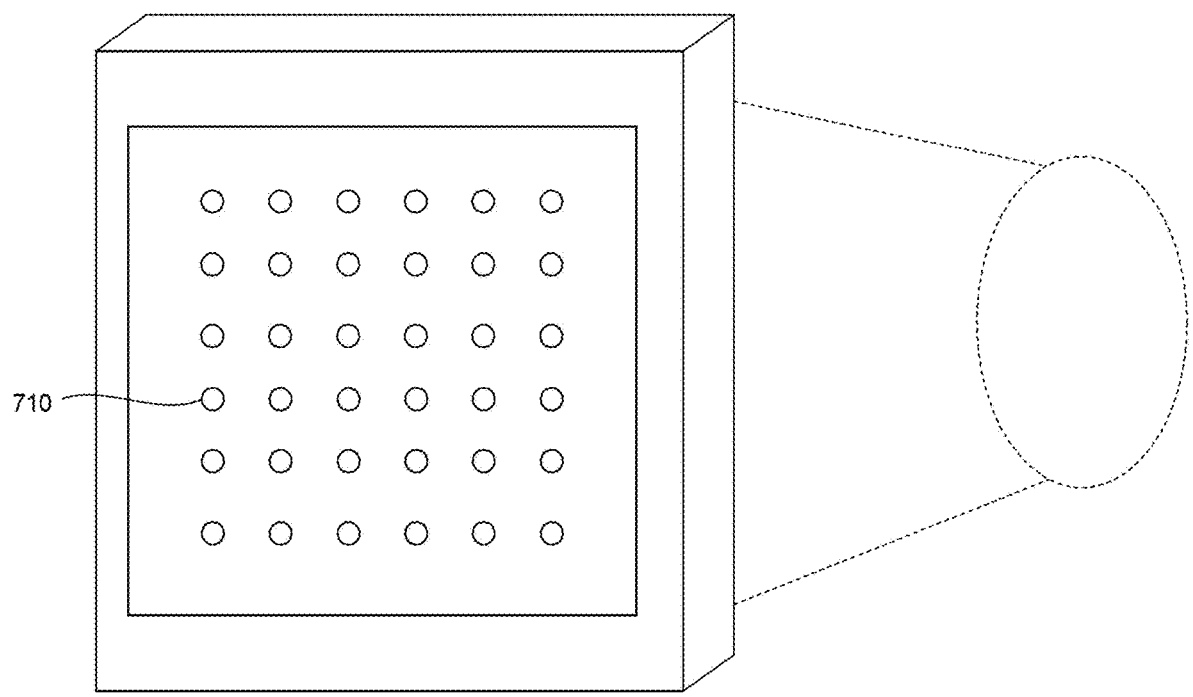
Figure 11C:
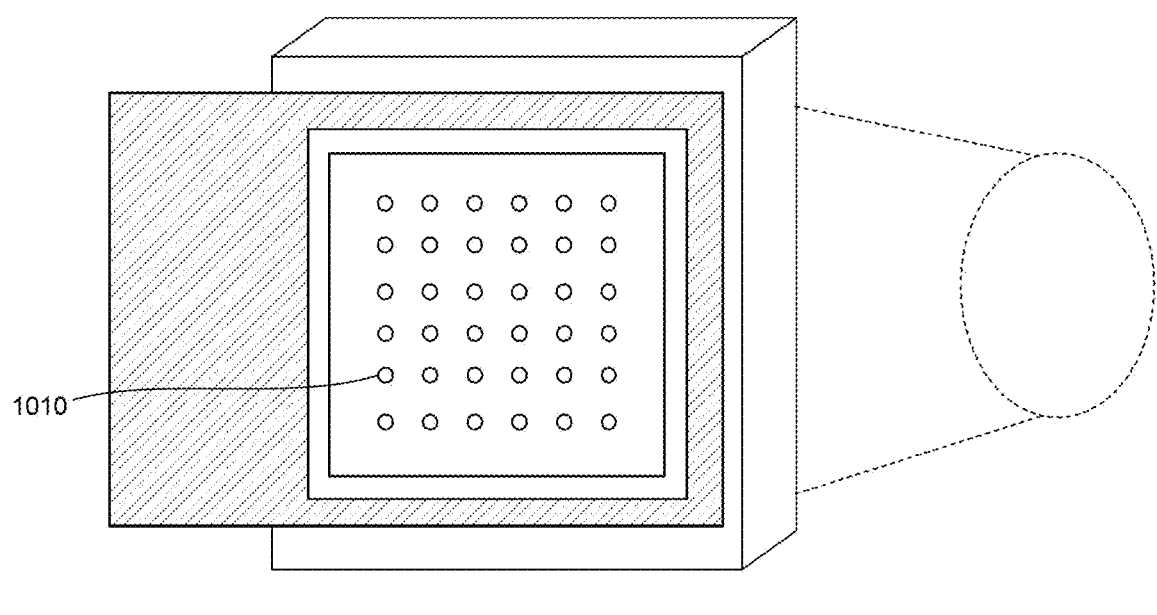

FIGS. 11A, 11B, and 11C illustrate aspects of injector 1100. FIG. 11A illustrates an injector 1100. The injector may comprise a printed circuit board 1120, a light source such as laser 1130, and a connector 1140, lenses which expand and collimate the light source, such as lens 1131-1133, a first grid plate 710, and a second grid plate 1010. Injector 1100 can also comprise a rear housing 1198 and a front housing 1199 as discussed with reference to FIG. 11B. The dotted line shows a beam of light being generated by the light source, such as laser 1130, and then emitted from the injector 1100 through both first grid plate 710 and second grid plate 1010. Connector 1140 may connect to other electronic and software controls, such as the OCS control system 160 or connect through printed circuit board 1120. The first grid plate 710 and second grid plate 1010 may contain any of the aspects of grid plates described above. Though not shown, other lenses, optical equipment, or an additional grid plate may be included in the injector 1100. Laser 1130 may be any suitable laser of power and wavelength. FIG. 11A also illustrates an unlabeled line representing the path taken by a beam of light generated by laser 1130. FIG. 11B illustrates additional aspects of injector 1100. FIG. 11B illustrates a partial view of a front housing of injector 1100, housing 1199. Illustrated in FIG. 11B is first grid plate 710. In some examples, grid plate 710 can be attached to front housing 1199 via an epoxy. FIG. 11C illustrates an additional view of housing 1199. Illustrated in FIG. 11C is a partial view of second grid plate 1010 within housing 1199. As illustrated in FIG. 11C, in some examples, secondary grid plate 1010 can be attached to a holder via an epoxy. A holder or similar hardware can be configured to slide in and out of a pocket or other area of the front housing configured for such a purpose. The holder can be secured to front housing 1199 with mountain hardware. Thus, it is possible to easily remove the holder, and reconfigure the secondary grid plate.

Although illustrated in FIG. 11A-11C on one end of the injector 1100, the first grid plate 710 and the second grid plate 1010 may be placed at or incorporated at other locations of injector 1100. The first grid plate 710 and the second grid plate 1010 may be of different sizes. The first grid plate 710 and second grid plate 1010 may be aligned such that the beam pathways of both grid plates are aligned and allow for the transmission of light through both grid plates. The grid plates may be integrated into an OCS and control the emission of specific beams of light from an injector. The grid plates may thus be used in conjunction with the systems and apparatuses described above to prevent beams from reaching specified MEMS mirrors and eliminating the need to park the specified mirror. Additionally, as the first grid plate and the second grid plate may be manufactured in any desired configuration, light may be blocked from reaching any set of MEMS mirrors. For example, the first grid plate 710 may be mounted internally within the injector 1100, and correspond to MEMS mirrors which are never intended to be used. The second grid plate 1010 may be mounted externally on one end of the injector 1100 and correspond to MEMS mirrors which are otherwise intended to be used at a later time. Mounting the second grid plate 1010 externally on one end of the injector may facilitate reduced time costs in replacing the second grid plate 1010 with another grid plate. The second grid plate 1010 may also be housed in a housing which allows for the rotation of the grid plate to enable a different set of MEMS mirrors to be blocked through the rotation of the grid plate. In other examples, the second grid plate 1010 may be slid in and out of a groove in the housing for holding the second grid plate 1010. The second grid plate 1010 can also be reconfigured or re-used by modifying which beam pathways are blocked or unblocked. In yet other examples, second grid plate 1010 can slide in and out of front housing 1199 and be reconfigured as necessary.

Figure 12A:
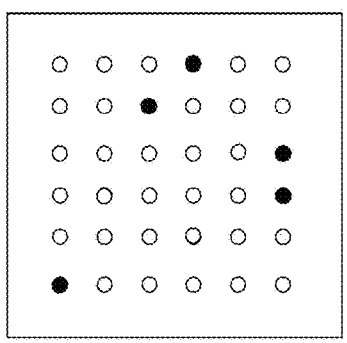
FIGS. 12A-12C are diagrams of a schematic view of a grid plates and a corresponding captured image according to aspects of the disclosure.
Figure 12B:
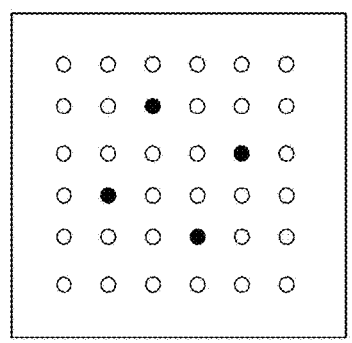
Figure 12C:
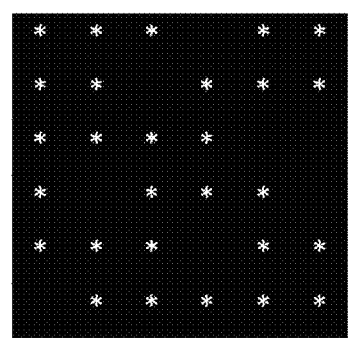

FIGS. 12A-12C illustrate additional schematic views of first grid plate 1210 and the second grid plate 1220, and an image 1250 captured by a camera, the image 1250 corresponding to the beams blocked by first grid plate 1210 and second grid plate 1220 collectively. FIG. 12A illustrates first grid plate 1210 with a grid of all beam pathways corresponding to the number of MEMS mirrors or rays of light, wherein "blacked" out circles correspond to blocked beam pathways. Similarly, FIG. 12B illustrates a second grid plate, 1220 with a grid of all beam pathways corresponding to the number of MEMS mirrors or rays of light, wherein "blacked" out circles correspond to blocked beam pathways.

FIG. 12C illustrates an image 1250 captured by a camera. Image 1250 illustrates in white asterisks beams of light which are captured by a camera. The camera imaging lens can image an injector beamlet array from a diffuser imaging screen onto a CMOS sensor. The imaging lens can have a high de-magnification, such as for example, of about 10:1. In this manner, an image at the camera's CMOS sensor is 10 times smaller than the injector beamlet array. An arbitrary de-magnification ratio can be used. It should be understood that other configurations are possible for the camera. The white asterisks on image 1250 correspond to beams of light that passed through the grid plates, while dark spots correspond to beams that were blocked.

According to some examples, the camera, in connection with the OCS control, may use the captured image to enable calibration of the MEMS mirror array, or test the entire OCS system, without need to physically modify the OCS system configuration. The OCS control can also control when beams are transmitted by the system or the MEMS mirrors responsive to information provided by the captured camera image. As an example, if there is a discrepancy between the expected pattern on image 1250 and the known configuration of the grid plates, such as first grid plate 1210 and second grid plate 1220, it may be inferred that a malfunction with MEMS mirror array has occurred. Other algorithms and tests may be derived from other information received by the camera and captured in the image, such as the intensity, the spread, focus, or angle of the beams captured. If suitable and configured to be capable of such, one of the grid plates can be rotated within the housing responsive to the OCS instructions.

Figure 13:
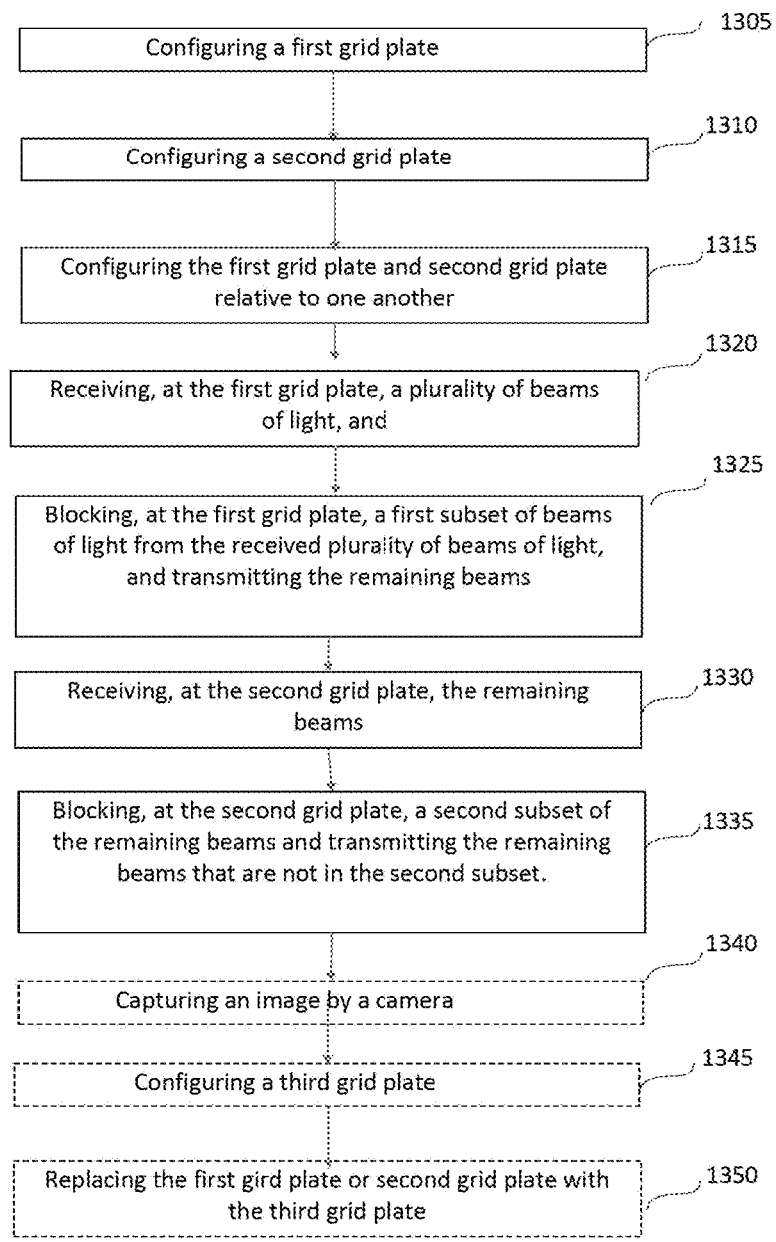
FIG. 13 is a flowchart of an example method according to aspects of the disclosure.

FIG. 13 illustrates flowchart of an example method 1300 of configuring an injector to correspond to a desired set of MEMS mirrors and block individual beams of light in an optical circuit switch. While the method 1300 is described below in a particular order, it should be understood that the operations may be performed in a different order or simultaneously. Moreover, operations may be added or omitted.

At block 1305, a first grid plate may be configured with a number of beam pathways and a number of blocked beam pathways. For example, the first grid plate may be similar to grid plate 610. The first grid plate may have blocked beam pathways corresponding to a first set of MEMS mirrors. The total number of blocked and unblocked beam pathways may correspond to a total number of MEMs mirrors in an OCS.

At block 1310, a second grid plate may be configured with a number of beam pathways and a number of blocked beam pathways. The second grid plate may have different blocked beam pathways than the first grid plate. The second grid plate may have blocked beam pathways corresponding to a second set of MEMS mirrors. The first set and second set of MEMS mirrors may have no common MEMS mirrors.

At block 1315, the first grid plate and second grid plate may be configured relative to one another in a beam injector, such as beam injector 1100.

At block 1320, the first grid plate may receive a plurality of beams of light. The first grid plate may block certain beams of light through its blocked beam pathways and allow other beams of light to enter through its first surface, through its beam pathways, and out through its second surface.

At block 1325, the first grid plate may block certain beams of light from the received plurality of beams of light in block 1320. The remaining beams of light may be transmitted through the first grid plate.

At block 1330, the second grid plate may receive the beams of light which passed through the first grid plate and were not blocked by the first grid plate.

At block 1335, the second grid plate may block certain beams of light through its blocked beam pathways and allow other beams of light to be transmitted. The transmitted beams of light may enter through the second grid plate's first surface, through its beam pathways, and out through its second surface.

At block 1340, an image may be captured by a camera. The image may correspond to the blocked and unblocked beams. For example, the image may include at least one spot of light, the at least one spot of light corresponding to the beam that was transmitted through the first grid plate in block 1210 and the second grid plate 1220. The image may further include at least one dark spot, the at least one dark spot corresponding to the blocked light of block 1325 or block 1335. Each beam of light transmitted or blocked by the first grid plate or second grid plate may be represented in the camera image as a spot of light or a dark spot, depending on whether it was transmitted or blocked by the respective pixel modulator.

According to some examples, at least one of the first or second grid plates may be replaced with another grid plate, for example, having a different pattern of beam pathways.

At block 1345, a third grid plate may be configured. The third grid plate may contain beam pathways and blocked beam pathways different than those present in the first grid plate and the second grid plates.

At block 1350, the first grid plate or the second grid plate may be replaced by the third grid plate.

According to some example methods, various aspects of the OCS system may be evaluated. For example, the functionality of the grid plates may be made based on algorithmic comparisons between information captured by the camera and information related to the functionality of the grid plate. As another example, operation of the MEMS mirror or MEMS mirror controllers may be evaluated by comparing at least information received by or captured from the camera.

While this specification contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A system comprising:
   a light source;
   a first grid plate;
   a second grid plate; and
   a housing configured to accommodate one or more components of the system, wherein:
     at least one of the one or more components includes the second grid plate,
     the housing comprises at least one pocket adjacent to the first grid plate, and
     the pocket is configured to allow for insertion and removal of the second grid plate,
   wherein:
     the first grid plate receives a plurality of beams of light from the light source,
     the first grid plate is configured to block a first subset of the plurality of beams of light by a first plurality of blocked beam pathways and transmit remaining beams of light through a first plurality of unblocked beam pathways, and
     the second grid plate is configured to block a second subset of the plurality of beams of light from the remaining beams of light transmitted through the first grid plate.

2. The system of claim 1, wherein the second grid plate is substantially aligned with the first grid plate.

3. The system of claim 1, wherein the system is a configurable beam injector included in an optical switching circuit, and is configured to transmit a number of beams that corresponds to a number of MEMS mirrors in the optical switching circuit.

4. The system of claim 1, further wherein the pocket is further configured to allow for the insertion and removal of the second grid plate while the system is operational.

5. The system of claim 4 wherein the pocket is configured to allow rotation of the second grid plate.

6. The system of claim 5, further comprising a data connector.

7. The system of claim 1, wherein the first grid plate and the second grid plate comprise beam pathways patterned in concentric circles.

8. The system of claim 1, wherein the first grid plate and the second grid plate both contain a square pattern of beam pathways.

9. The system of claim 1, wherein:
   the second grid plate comprises a second plurality of blocked beam pathways, and
   the first grid plate and the second grid plate utilize an optical blocking material to form the blocked beam pathways.

10. The system of claim 1, wherein the first and second grid plates collectively contain a number of pathways for the beams of light that corresponds to a number of MEMS mirrors used in an optical switching circuit.

11. The system of claim 1, further comprising at least one lens to expand and collimate a beam of light into the plurality of beams of light.

12. The system of claim 1, wherein pocket is positioned within a front portion of the housing and the light source is positioned within a rear portion of the housing.

13. An optical circuit switch (OCS) comprising:
    a microelectromechanical systems (MEMS) mirror configured to receive a beam of light;
    a configurable beam injector comprising:
      a light source;
      a first grid plate;
      a second grid plate; and
      a housing configured accommodate one or more components of the configurable beam injector;
    wherein:
      at least one of the one or more components includes the second grid plate,
      the housing is configured to allow for insertion and removal of the second grid plate while the OCS is operational,
      the first grid plate receives a plurality of beam of lights from the light source,
      the first grid plate is configured to block a first subset of the plurality of beams of light by a first plurality of blocked beam pathways and transmit remaining plurality of beams of light through a first plurality of beam pathways; and
      the second grid plate is configured to block a second subset of beams of light from the remaining plurality of beams of light transmitted through the first grid plate.

14. The optical circuit switch of claim 13, wherein the configurable beam injector further comprises a data connector.

15. The optical circuit switch of claim 13, wherein the configurable beam injector further comprises at least one lens to expand and collimate a beam of light into the plurality of beams of light.

16. A method of selectively blocking, in an optical switching circuit, a subset of beams of light generated by a light source comprising:
    providing a first grid plate with a number of first beam pathways and first blocked beam pathways;
    providing a second grid plate with a number of second beam pathways and second blocked beam pathways, wherein:
      the second grid plate is removably insertable into a pocket of a housing of the optical switching circuit, and
      the pocket of the housing is adjacent to the first grid plate;
    sequentially arranging the first grid plate and the second grid plate in a path of beams of light generated from the light source;
    blocking, by the first grid plate, a first subset of beams of light to a first subset of MEMS mirrors; and blocking, by the second grid plate, a second subset of beams of light to a second subset of MEMS mirrors.

17. The method of claim 16, further comprising providing a third grid plate with a number of beam pathways and blocked beam pathways.

18. The method of claim 17, wherein the third grid plate is configured differently than the first grid plate and the second grid plate.

19. The method of claim 18, further comprising providing replacing the first grid plate or the second grid plate with the third grid plate.

20. The method of claim 16, further comprising:
capturing, by a camera, an image, wherein the image represents blocked beams of light with dark spots and unblocked beams of light with light spots; and
calibrating, based on the captured image, at least one MEMS mirror of the first subset of MEMS mirrors or the second subset of MEMS mirrors.

* * * * *